(12) United States Patent
Raulin et al.

(10) Patent No.: US 7,902,783 B2
(45) Date of Patent: Mar. 8, 2011

(54) MIXED DEVICE FOR CONTROLLING POWER TRANSFER BETWEEN TWO CORES OF A DIRECT CURRENT NETWORK AND SUPPLYING AN ALTERNATING CURRENT MOTOR

(75) Inventors: Loic Raulin, Plaisance du Touch (FR); Hubert Piquet, Garrigues (FR); Xavier Roboam, Colomiers (FR); Henri Foch, Toulouse (FR); Jeremi Regnier, Toulouse (FR)

(73) Assignees: Airbus France, Toulouse (FR); Centre National de la Recherche Scientifique, Paris (FR)

( * ) Notice: Subject to any disclaimer, the term of this patent is extended or adjusted under 35 U.S.C. 154(b) by 404 days.

(21) Appl. No.: 12/090,486

(22) PCT Filed: Oct. 27, 2006

(86) PCT No.: PCT/EP2006/067854
§ 371 (c)(1),
(2), (4) Date: Apr. 17, 2008

(87) PCT Pub. No.: WO2007/048838
PCT Pub. Date: May 3, 2007

(65) Prior Publication Data
US 2008/0218114 A1 Sep. 11, 2008

(30) Foreign Application Priority Data

Oct. 27, 2005 (FR) ...................................... 05 53270

(51) Int. Cl.
*H02P 1/32* (2006.01)
(52) U.S. Cl. .................... 318/496; 318/494; 318/400.26; 318/722

(58) Field of Classification Search .................. 318/496, 318/126, 494, 400.26, 400.28, 400.29, 722, 318/800, 801; 363/40, 45, 46, 55, 56.01, 363/56.02, 71, 72
See application file for complete search history.

(56) References Cited

U.S. PATENT DOCUMENTS

| 4,772,180 | A | * | 9/1988 | Walker et al. | .................... 416/33 |
| 4,927,329 | A | * | 5/1990 | Kliman et al. | ................. 416/127 |
| 4,939,997 | A | * | 7/1990 | Hoffman | ....................... 102/503 |

(Continued)

FOREIGN PATENT DOCUMENTS

| DE | 196 24 555 | 1/1998 |
| EP | 1 494 343 | 1/2005 |
| EP | 1 511 149 | 3/2005 |

OTHER PUBLICATIONS

U.S. Appl. No. 12/090,510, filed Apr. 17, 2008, Raulin, et al.

*Primary Examiner* — Walter Benson
*Assistant Examiner* — Thai Dinh
(74) *Attorney, Agent, or Firm* — Oblon, Spivak, McClelland, Maier & Neustadt, L.L.P.

(57) ABSTRACT

A combined device for instantaneous control of power transfer between two cores of a direct current network and for powering an alternating current engine. The device includes: an assembly of two three-phase inverters, each including three switching cells connected to the engine, which engine includes three stator windings connected to the two three-phase inverters, and a module for controlling the assembly, which ensures both an adjustable direct current power transfer and enables stabilization of the direct current voltage of one of the two cores if it is not connected, and the control of the engine.

5 Claims, 3 Drawing Sheets

U.S. PATENT DOCUMENTS

| | | |
|---|---|---|
| 7,009,856 B2 * | 3/2006 | Moon et al. .................... 363/37 |
| 7,057,371 B2 * | 6/2006 | Welchko et al. ......... 318/400.27 |
| 7,098,619 B2 * | 8/2006 | Stridsberg .................... 318/563 |
| 7,154,237 B2 * | 12/2006 | Welchko et al. ......... 318/400.27 |
| 7,199,535 B2 * | 4/2007 | Welchko et al. .............. 318/105 |
| 2005/0253395 A1 * | 11/2005 | Blumel ....................... 290/40 C |

* cited by examiner

MIXED DEVICE FOR CONTROLLING POWER TRANSFER BETWEEN TWO CORES OF A DIRECT CURRENT NETWORK AND SUPPLYING AN ALTERNATING CURRENT MOTOR

TECHNICAL FIELD

This invention relates to a combined device for controlling the power transfer between two cores of a direct current network and for powering an alternating current engine.

The field of the invention is in particular that of direct current networks on board an aircraft. However, the device of the invention can also be used with any type of on-board networks (naval, motor vehicle, etc.), and even networks not on board, for example in the field of stationary applications corresponding to a stationary network (direct current local network, railroad, etc.).

To keep the description simple, we will limit it to the on-board aeronautical field.

In the remainder of the description, the terms "continuous networks" and "direct current networks" have the same meaning and can therefore be used interchangeably.

PRIOR ART

The benefit of transferring energy by direct current connections in on-board networks is primarily due to the development of power electronics, in particular due to the increase in the number of on-board electromechanical actuators, on board airplanes. Most of these actuators, controlled and powered with static converters, indeed require the presence of a direct current voltage stage. However, such a stage is obtained from a conventional alternating current network using an alternating-direct current conversion.

It is possible to replace all of the conversion units thus used with a centralized direct voltage power distribution: this distribution can be a total direct distribution (high-voltage direct current or HVDC network) or a partial direct distribution (combined alternating-direct current network).

However, the implementation of such direct current networks presents new technical problems, in consideration in particular of the need to ensure the stability of these networks regardless of the type of charge supplied.

To obtain a sufficient voltage quality for each equipment item connected to such a direct current network and to filter the harmonics generated by this equipment, it is possible to use a filter, such as an LC-type filter (L: inductance; C: capacitance) placed at the input of the equipment. In the current direct current networks, the charges connected are often controlled by power and control electronics, which absorb, at the scale of the cut-off frequency of the filter, a near-constant power. Such a phenomenon is even more notable insofar as the regulation of the connected equipment is dynamically efficient. However, the input filter, placed between the direct current power supply and the regulated static converter, is then capable of breaking into oscillation upon a powerful impact. The higher the L/C ratio is, which is especially the case when the equipment is connected over a long cable length, the greater the voltage oscillations at the terminals of the filter capacitance.

The document referenced [1] at the end of the description thus demonstrates that any system consisting of a filter charged by a static converter, which absorbs a constant power on the scale of the dynamics of the filter, is a potentially unstable system.

The architectures of the current alternating current networks consist of connecting all of the equipments to a single centralized "core" via lines, which can be very long, and thus have significant impedance.

A "core" is a source-charge interconnection node including protective and contact members, of which the voltage (in this case, direct current) is stabilized by an external element. A core can be connected to an energy source: alternator+rectifier group ("connected core"). It can also be connected only to a power source (storage member) or very simply to one or more other cores ("non-connected core").

In consideration of the potential instability phenomena mentioned above, the propensity when very long cables are used to increase this phenomenon, it is therefore neither sufficient nor prudent to model the architecture of direct current networks on that of alternating current networks.

The documents referenced [2] and [3] describe two solutions of the prior art intended to reduce the risks of instability.

The first of these two documents describes a power distribution system on board an airplane, in the context of the MEA ("More Electric Aircraft") initiative. Most of the charges, including actuators, are regulated by using bidirectional power converters, which control and condition the power on the basis of a direct current bus. The loss of stability in the event of significant disturbances is analyzed in this document in order to demonstrate the usefulness of a nonlinear stability analysis method.

The second of these two documents describes an active direct current bus conditioner for a distributed power system, which compensates the harmonic and reactive current on a direct current bus and actively attenuates the oscillations in the direct current power system.

The invention is intended to combine two distinct functions:

a) reduce the risks of instability by interfacing, between two cores, placed in different areas of the system in which the network is installed, and therefore separated by significant distances, power and control electronics capable of controlling power transfers between these cores, while ensuring the quality and availability of this power in normal mode as well as in degraded mode (loss of a source, excessive power on a core, etc.), and b) powering an alternating current engine.

DESCRIPTION OF THE INVENTION

The invention relates to a device making it possible to combine two functions:

a) controlling the power transfer between two cores (nodes) of a direct current network; and b) controlled powering of an alternating current engine, characterized in that it includes:

an assembly of two three-phase inverters, each consisting of three switching cells connected to said engine, which engine has three stator windings connected to the two three-phase inverters, and a module for controlling this assembly, which ensures both an adjustable direct current power transfer and stabilization of the direct current voltage of one of the two cores and the control of said engine.

Advantageously, each switching cell consists of two switches unidirectional in voltage and bidirectional in current. Each switch can include a transistor associated with a diode in an anti-parallel structure.

The device of the invention has the following advantages:

It makes it possible to design mesh network architectures with decentralized cores, and to ensure the stability of these networks by minimizing the cable lengths between the stabilized voltage nodes (cores) and the equipment, even when there are destabilizing charges absorbing a near-constant power.

In normal mode, it performs a controllable power transfer between two cores, making it possible to distribute and balance the power fluxes of the network(s). The stability is ensured by a current-controlled connection, even if the cable lengths between cores are long and meshes capable of oscillating are present. The core connection/disconnection modes are therefore stable and smooth.

In normal mode, it can act as a "voltage stabilizer" of a core not connected to a direct current network.

In degraded mode (for example, when a source is lost), it can act as a "voltage stabilizer" of the core connected to a default source after disconnection of the core from said source.

It does not require additional inductances insofar as the inductive windings of the alternating current engine are used. The power supply function is altered little or none by long cable lengths.

The voltages applied differentially at the six terminals of the three windings of the alternating current engine are doubled with respect to the voltages available from a core, which makes it possible to envisage, for the same power, a decrease in the current and, in principle, a more advantageous sizing of the alternating current engine.

The additional cost of silicon is zero with respect to a conventional function of an actuator with equivalent power.

DETAILED DESCRIPTION OF SPECIFIC EMBODIMENTS

Figure 1:
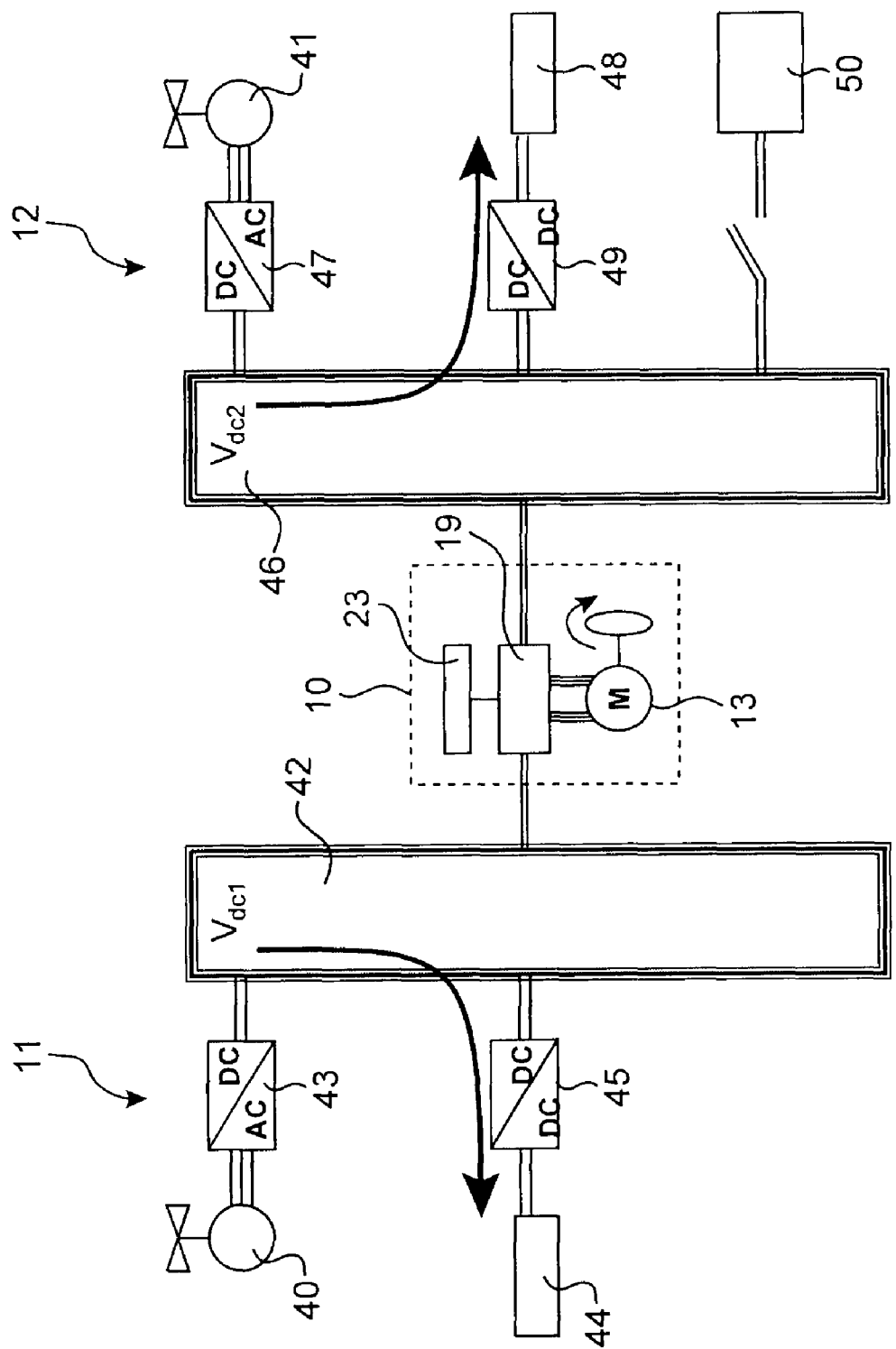
FIG. 1 shows the combined device for controlling the power transfer between two cores of a direct current network, and for powering an alternating current engine according to the invention.
Figure 3:
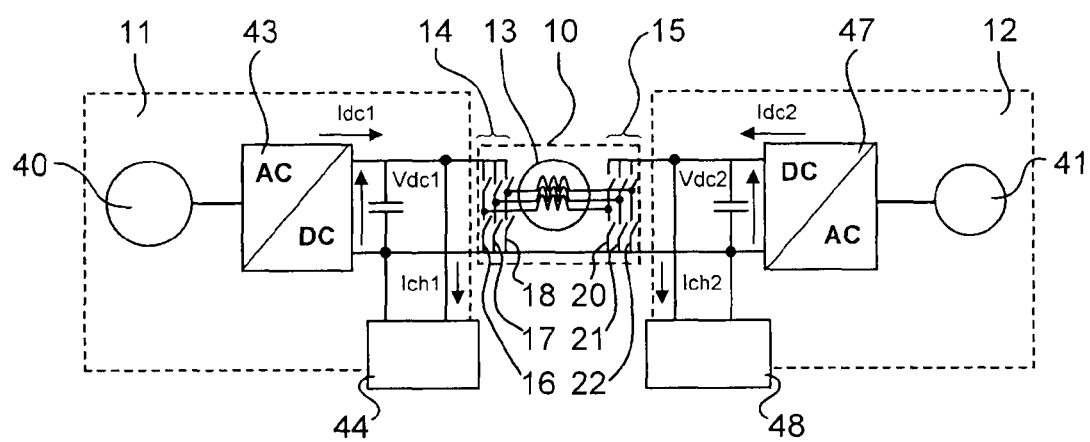
FIG. 3 shows an example embodiment of the device of the invention.

FIG. 1 shows a diagrammatic representation of the combined device 10 for controlling the power transfer between two cores 42 and 46 of a direct current network and for powering an alternating current engine 13 of the invention, which includes:

an assembly 19 of two three-phase inverters 14 and 15 each consisting of three switching cells 16, 17, 18 and 20, 21, 22 connected to said engine 13, as shown in FIG. 3, wherein each switching cell consists of two switches unidirectional in voltage and bidirectional in current, for example a transistor associated with a diode in an antiparallel structure, which alternating current engine 13 has three stator windings connected to the two three-phase inverters, and a module 23 for controlling this assembly 19 so as to ensure both an adjustable direct current power transfer, and stabilization of the direct current voltage of the two cores 42 and 46 and the control of said engine.

The control of the switching cells 16, 17, 18 and 20, 21, 22 enables the near-instantaneous control of the current on the line connecting the two cores 42 and 46, with response times on the order of several switching periods of associated cells in the device of the invention (typically several milliseconds). This control makes it possible to:

establish a regulation of the power transfer between the two cores 42 and 46 in a normal operation mode, as well as in the event of a malfunction on the generator associated with one of them, in which this power transfer can take place indifferently from one of the two cores to the other;

regulate and balance the powers supplied by the alternators that power the cores;

help to ensure, with a suitable control of the two switching cells of the device of the invention, the stability of the voltage of the two cores 42 and 46 supplied at the level of the cores.

The device of the invention thus performs a plurality of functions. It simultaneously enables:

an adjustable direct current power transfer, and control and stabilization of the direct current voltage of one of the two cores 42 or 46, and powering and control of an alternating current engine.

The device of the invention is more specifically oriented toward the management and control of energy exchanges between two decentralized cores, which have a fundamental "voltage source" property (at least instantaneously), which can be confirmed by a set of capacitors is necessary.

Figure 2:
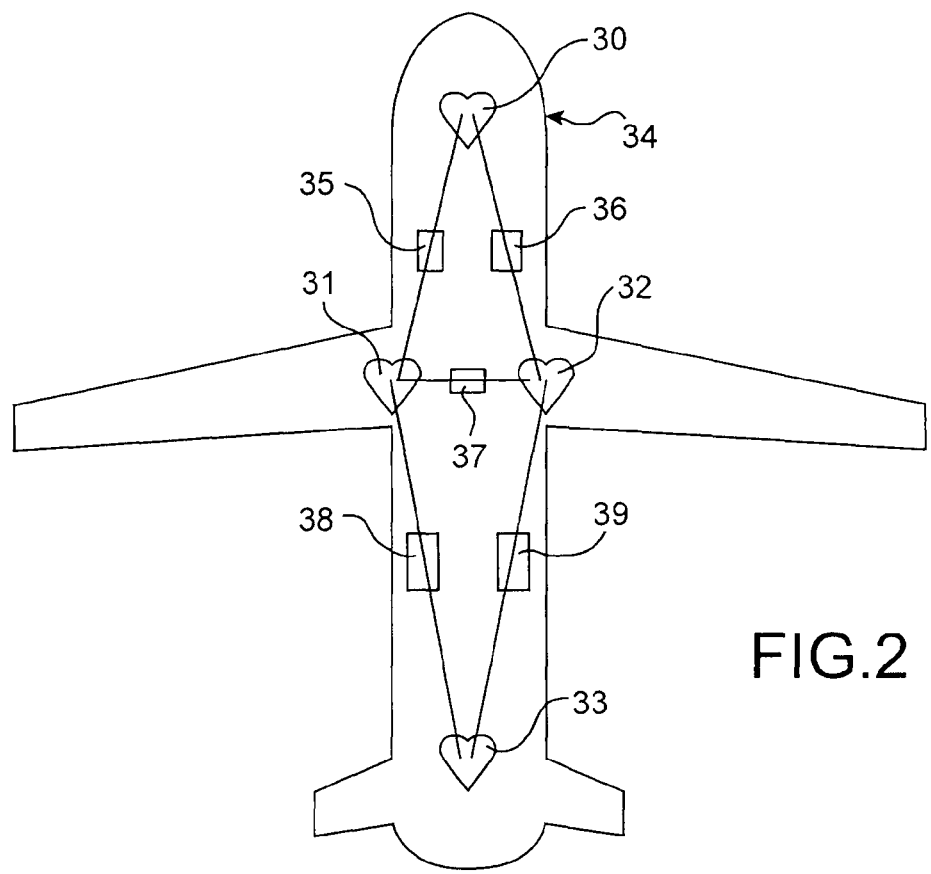
FIG. 2 shows an on-board architecture with a decentralized core according to the invention.

FIG. 2 thus shows an architecture, on board an airplane 34, with decentralized cores 30, 31, 32 and 33, in which a plurality of devices according to the invention 35, 36, 37, 38 and 39 are respectively arranged between two adjacent cores.

We will now consider each of the functions of the device of the invention.

Adjustable Power Transfer

The device of the invention makes it possible to equally distribute the power consumed by network users over the alternators.

FIG. 1 thus shows the distribution of power consumed between two alternators 40 and 41.

The first alternator 40 is connected to a first bus bar (first core) 42 via a first stabilized alternating-direct current rectifier module 43. A first charge 44 is connected to this first bus bar 42 via a first direct-direct current module 45.

The second alternator 41 is connected to a second bus bar (second core) 46 via a second stabilized alternating-direct current rectifier module 47. A second charge 48 is connected to this second bus bar 46 via a second direct-direct module 49.

The device of the invention 10, which is arranged between the two bus bars (cores) 42 and 46, makes it possible to balance the powers supplied by the two alternators 40 and 41. When a charge variation occurs on one of the cores 42 or 46, the alternator with the lowest charge supplies, via the device of the invention 10, a portion of the power necessary for powering the charges 44, 48 and 50.

In normal operation, the power to be distributed over the alternators 40 and 41 can thus be calculated according to the total sum of the consuming elements, and no longer the sum of the consuming elements connected to a single isolated alternator. The point of operation of these alternators 40 and 41 can thus be imposed and controlled. The device of the invention 10 acts as an electronic "valve" capable of regulating the power transfers, even in the presence of variations in the voltage of the direct current source that powers it.

Control and Stabilization of Voltage

The device of the invention 10 makes it possible to power an unconnected core from a connected core, or to manage the reconfiguration of the network in the event of a breakdown of one or more sources.

The device of the invention 10, in the event of a breakdown of one of the alternators 40 and 41, makes it possible to transfer power to the part of the network located on the side of the malfunctioning alternator and to control the transient and oscillating phenomena that may occur.

Control of the Alternating Current Engine

As shown in FIG. 3, the electric engine 13 is connected differentially between the two inverters 14 and 15 connected to the two rectifier assemblies 11 and 12.

This solution makes it possible to have a power supply voltage of said engine 13 doubled with respect to the case in which the power supply is provided using a single voltage inverter. This mode of operation is standard, and the control of the two inverters 14 and 15 in order to obtain the required performance of the engine 13 is part of the knowledge of a person skilled in the art.

If the two cores 42 and 46 are separated by a large distance, each inverter 14 or 15 must be placed near the core to which it is connected. The line inductances (which are not shown in the figure) are then in series with the windings of the engine 13.

Therefore, the windings of the engine 13 are used as means for circulating a homopolar current component in the three phases of the inverters, a power transmission vector between the cores.

The control of this homopolar component, which is achieved by the control of the inverters, makes it possible to:
- implement a regulation of the power transfer between the two cores 42 and 46 in the normal mode of operation, as well as in the event of a malfunction on the alternator associated with one of them; there is no preferred direction for this power transfer, which can occur indifferently from one core to the other;
- regulate and in particular balance the powers supplied by the alternators 40 and 41, which power the cores;
- help to ensure, with a suitable control of the two inverters 14 and 15, the stability of the voltage supplied at the level of the cores 42 and 46.

If not energy exchange takes place between the two cores, the engine 13 is powered normally and a conventional actuator function is obtained. If an energy exchange is required, an adjustable power can be transmitted from one core to the other. A homopolar current component is then superimposed with the alternating currents of the engine 13. In terms of control, the functions are very easily and very simply separated by reasoning in a Park's reference frame. Indeed, the control (torque, speed, etc.) of the actuator is conventionally achieved by controlling the axis currents (d, q), whereas the power transfer and voltage stabilization functions are "superimposed" by a simple control of the homopolar current (axis o). We thus use all of the degrees of freedom of the three-phase system.

Thus owing to the structure of the device of the invention, insofar as the total current (direct+alternating) remains lower than the maximum current allowable by the switches, and by the engine 13, the latter is still powered under normal conditions (non-limited) of operation, and the power exchange between the two networks is transparent for the engine. If the maximum allowable current is reached and priority is given to the power transfer and voltage stabilization functions (the direct current component has priority), it is necessary to reduce the alternating component of the current in the engine: the actuator function is then degraded.

Example Embodiment

Figure 4A:
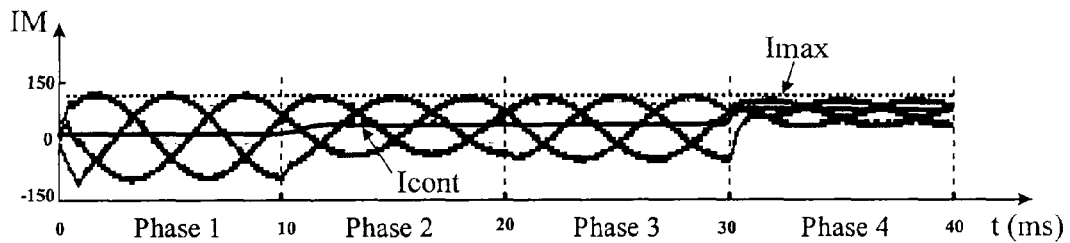
FIGS. 4A to 4D show time charts obtained with the example embodiment of FIG. 3, which figures respectively show the currents in the engine IM, the voltages of the buses VB, the currents of the buses IB1, and the currents of charge IC1, as a function of time.

The engine 13 of the device of the invention is characterized by a maximum operation under a phase current Imax with an amplitude of 150 A, as shown in FIG. 4A. The strategy for controlling the inverters 14 and 15 integrates, as a constraint, never exceeding this value, so as to ensure the safety of the engine 13 and the inverters 14 and 15. This strategy is not obligatory in the structure of the device of the invention and is presented here by way of an example. The addition of a homopolar component, which involves a direct current component Icont in the three phases of the engine, is therefore done here to the detriment of the amplitude of the sinusoidal component of the phase currents, as shown in FIG. 4A (the corollary of this choice is therefore a reduction in the mechanical power supplied by the engine).

The definition of the homopolar component of the current that passes through the device of the invention is in this case guided by the objective of balancing the powers supplied by the two alternators 40 and 41. The achievement of this objective can be evaluated in the second (phases 3 and 4) part of FIG. 4C, corresponding to a normal operation, showing currents Idc1 and Idc2, which are the images of the powers supplied by the two alternators 40 and 41.

Figure 4B:
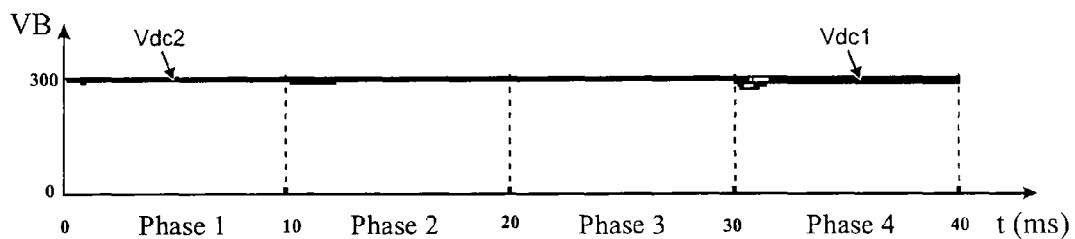
Figure 4C:
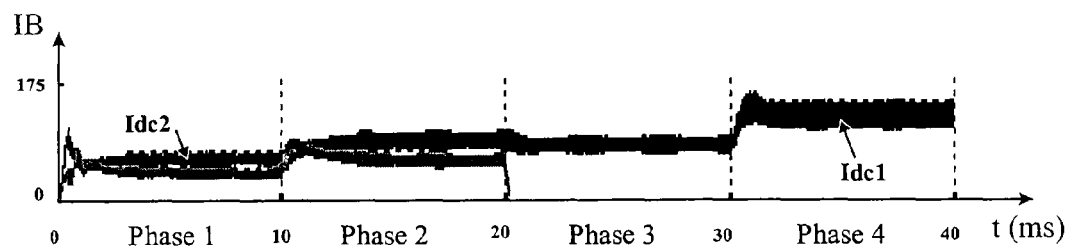
Figure 4D:
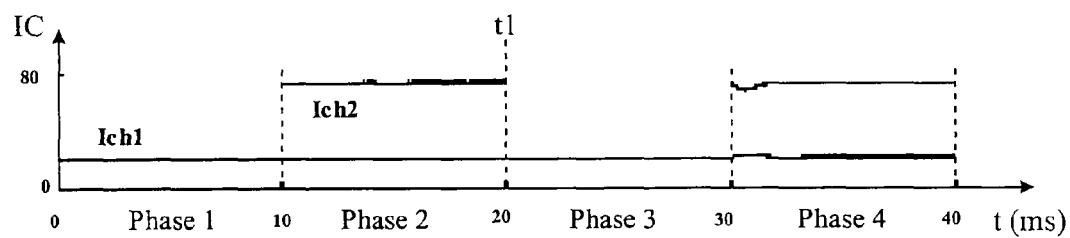

The charge 44 of the core 42 is characterized by a constant absorbed current Ich1 as shown in FIG. 4D. The charge 48 of the core 46 is characterized by an intermittent absorbed current Ich2 as shown in FIG. 4D.

The alternators 40 and 41 are initially both functional. At time t1=20 ms, it is assumed that the alternator 41 knows of a malfunction and that it is no longer available for supplying the power needed to the core 46. FIG. 4C shows the cancellation of the current supplied Idc2.

All of the power is then supplied by alternator 40. The maintenance of the voltage of the core 46 Vdc2 is ensured by the switch of the inverter 15 to rectifier operation mode. FIG. 4B shows the change in the voltage available at the two cores 42 (Vdc1) and 46 (Vdc2).

REFERENCES

[1] "Méthode d'étude de la stabilité des ensembles convertisseurs-filtres" by Philippe Barrade, Hubert Piquet, and Yvon Cheron (Journal de Physique III, vol. 6, pages 91 to 104, January 1996)

[2] "Subsystem interaction analysis in power distribution system of next generation air-lifters" by Sriram Chandrasekaran, Douglas K. Lindner, Konstantin Louganshi, and Dushan Boroyevich (European Power Electronics Conference, Lausanne, Switzerland, 7-9 September 1999, pages 1-6)

[3] "An active bus conditioner for a distributed power system" by Kun Xing, Jinghong Guo, Wenkang Huang, Dengming Peng, Fred C. Lee and Dusan Borojevic (Power Electronics Specialists Conference, pages 895-900, 1999 PESC 99. 30th Annual IEEE)

The invention claimed is:

1. A combined device for an aircraft which controls power transfer between two decentralized cores of a direct current network and which powers an alternating current motor, comprising:
   a first core of the two cores, to which is connected a first alternator via a first stabilized alternating-direct current rectifier module, is positioned in a first area of the aircraft;

a second core of the two cores, to which is connected a second alternator via a second stabilized alternating-direct current rectifier module, is positioned in a second area of the aircraft, the second area being separated from the first area by a significant distance, the first core and the second core are connected to a plurality of charges for the aircraft;

an assembly of two three-phase inverters, each three-phase inverter of the two three-phase inverters including three switching cells connected to the motor, the motor includes three stator windings whose ends are connected to the two three-phase inverters; and a module that controls the assembly, which ensures both an adjustable direct current power transfer and stabilization of direct current voltage in balancing the powers supplied by the two alternators, and the control of the motor.

2. The device according to claim 1, wherein each switching cell comprises two switches unidirectional in voltage and bidirectional in current.

3. The device according to claim 2, wherein each switch includes a transistor associated with a diode in an anti-parallel structure.

4. The device according to claim 1, wherein the first core is also connected to a first direct-direct current module and the second core is also connected to a second direct-direct current module.

5. The device according to claim 1, wherein one charge of the plurality of charges is an electromechanical actuator.

* * * * *